United States Patent [19]

Lonardi

[11] Patent Number: 5,393,038
[45] Date of Patent: Feb. 28, 1995

[54] METHOD FACILITATING THE INTRODUCTION OF A PIERCING ROD INTO A TAPHOLE OF A SHAFT FURNACE AND SPECIAL CLAMP FOR IMPLEMENTING THIS METHOD

[75] Inventor: Emile Lonardi, Bascharage, Luxembourg

[73] Assignee: Paul Wurth S.A., Luxembourg, Luxembourg

[21] Appl. No.: 271,935

[22] Filed: Jul. 7, 1994

Related U.S. Application Data

[63] Continuation of Ser. No. 67,761, May 26, 1993, abandoned.

[30] Foreign Application Priority Data

May 27, 1992 [LU] Luxembourg ............................ 88120

[51] Int. Cl.⁶ .............................................. C21B 7/12
[52] U.S. Cl. ...................................... 266/45; 266/271; 266/272
[58] Field of Search ................... 266/45, 271, 272, 273

[56] References Cited

U.S. PATENT DOCUMENTS 4,418,894 12/1983 Mailliet ................................ 266/271
4,602,770 7/1986 Mailliet et al. .......................... 266/45

Primary Examiner—Scott Kastler
Attorney, Agent, or Firm—Fishman, Dionne & Cantor

[57] ABSTRACT

A method is provided for facilitating the introduction of a piercing rod into a taphole previously closed by a taphole clay. The rod is gripped by a clamp which imparts to the rod a powerful axial force and an oscillatory movement about its longitudinal axis.

11 Claims, 2 Drawing Sheets

METHOD FACILITATING THE INTRODUCTION OF A PIERCING ROD INTO A TAPHOLE OF A SHAFT FURNACE AND SPECIAL CLAMP FOR IMPLEMENTING THIS METHOD

This is a continuation of application Ser. No. 08/067,761, filed on May 26, 1993, now abandoned.

BACKGROUND OF THE INVENTION

This invention relates generally to a method facilitating the introduction of a piercing rod into a taphole of a shaft furnace before complete hardening of a taphole clay which has previously been injected into the hole. More particularly, this invention relates to a method in which the introduction is carried out without a hammer, under the effect of an axial thrust exerted by a powerful drive means on the rod.

This invention relates to the now well-known "lost rod" method, in which, after having closed the taphole with a taphole clay, a metal rod is driven into the latter before it hardens completely. The opening of the taphole is produced by extracting, at the desired moment, the rod from the hardened taphole clay.

Most often, the machines used for implementing this method comprise a powerful bidirectional pneumatic hammer for developing the energy necessary for the introduction and for the extraction of the rod. A power hammer, as is used on these machines, is not without its drawbacks. First, these hammers exert considerable stress and vibration on the equipment, in particular on the rod-coupling clamp, which is, as a result, subjected to rapid wear. It is also extremely noisy, and often does not conform to the ever stricter standards that are aimed at reducing the noise level in an industrial environment.

The aforementioned reasons have excellerated the tendency toward doing away with the bidirectional hammer. The next generation of piercing machines work with powerful drive means in order to drive in and to extract the rod forcefully, that is to say without a hammer.

The forceful extraction of the piercing rod proves fairly simple. In fact, it is necessary only to fix a coupling, for example a clamp, firmly to the free end of the rod and to push back this coupling axially in the extension of the rod, under the action of a powerful drive means, for example a jack or a hydraulic motor. The rod will then be forcefully extracted from the hardened taphole clay, under the effect of a simple axial pulling force, silently and without vibrations.

The operation for forceful introduction of the rod is, however, much more difficult. In fact, it is not sufficient to apply a strong axial thrust to one end of the rod, in order to drive the other end into the hardening taphole clay. In view of the long length of the rod and the rapid hardening of the taphole clay previously introduced into the taphole, the rod would rapidly be subjected to buckling and could become blocked in the taphole; unless special precautions have been taken, (i.e.), reducing the equivalent buckling length of the rod. It should be noted that the latter is a fictional length which takes into account the affect of the mode of fastening of the rod and of the mode of application of the force on the tendency to buckle.

This equivalent buckling length may, for example, be reduced by guiding the rod in the axis of the force applied using intermediate guides. A similar effect is obtained by applying the axial thrust not at the free end of the rod, but, with the aid of a reciprocating movement of a clamp, at a relatively small distance from the taphole. This method was proposed for the first time in the Luxembourg Patent Specification LU-87 915 which corresponds to U.S. application Ser. No. 862,487 filed Apr. 2, 1992, and which is assigned to the assignee hereof, all of the contents of which are incorporated herein by reference.

It will be appreciated that a reduction in the axial force required to introduce the rod into the taphole clay would both reduce the risk of buckling and facilitate (speed-up) the insertion of the rod into the taphole clay.

An object of the present invention is to provide a method for introducing the rod into the rapidly hardening taphole clay which allows the resistance to penetration of the rod into the taphole clay to be reduced.

SUMMARY OF THE INVENTION

The above-discussed and other drawbacks and deficiencies of the prior art are overcome or alleviated by the method facilitating the introduction of a piercing rod into a taphole of a shaft furnace and special clamp for implementing this method. In accordance with the present invention, the method essentially subjects the rod being introduced into the taphole clay to an oscillatory or rotational movement about the rod's longitudinal axis.

This oscillatory or rotational movement of the rod about its longitudinal axis reduces the resistance to axial advance of the rod into the hardening taphole clay. The piercing machine may consequently work with a smaller thrust in order to drive the rod into the clay.

There are many advantages to this reduction in thrust or force for the insertion of the piercing rod. With the same margin of safety against buckling of the piercing rod, this reduction of force allows for a decrease in the number of intermediate guides for holding the rod in the axial direction. When the piercing machine of aforementioned U.S. Ser. No. 862,487 is used, the aforementioned reduction in force allows a large increase in the travel of the reciprocating movement and therefore a great reduction in the time required to insert the piercing rod to the desired depth in the shaft furnace. In addition, the significant increase of speed for insertion of the piercing rod into the taphole clay may also allow the use of taphole clays with faster solidification rates without having to resort to more powerful machines.

It has been found that an important feature of this invention is the subjecting of the piercing rod to an oscillatory or rotational movement about the rod's longitudinal axis and that this movement may have an angular amplitude of less than 180°. Larger amplitudes (greater than 180°) do not appear to give better results.

This invention also relates to a special clamp which may be used on a mounting of a conventional piercing machine in order to transmit to the rod the oscillatory or rotary movement about its longitudinal axis during introduction of the rod into the hardening taphole clay.

This clamp could be a unidirectional pneumatic clamp which makes it possible to transmit to the rod axial force so the rod can penetrate into the taphole clay. Means for making the rod oscillate or rotate about its longitudinal axis during the application of the force for introducing the rod is provided by the present invention.

It should be noted that the clamp could also be a bidirectional pneumatic clamp, of the type of those described in Luxembourg Patent Specification LU-87 915 and its Patent of Addition LU-88 020 (corresponding to U.S. Ser. No. 862,487). This clamp may then be used both for introducing and for extracting the rod. During the extraction of the rod, the oscillatory movement will of course be stopped.

If the clamp is a unidirectional clamp capable only of introducing the rod into the taphole clay, it will naturally be necessary to provide on the mounting of the machine a second coupling intended for the extraction of the rod. This second coupling is, for example, a conventional clamp mounted on a drilling apparatus which can be slid on the mounting. The second coupling is most often mounted on the mounting behind the first clamp, in order to be capable of drilling the taphole with a conventional bit, when the lost rod method cannot be used for one reason or another.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
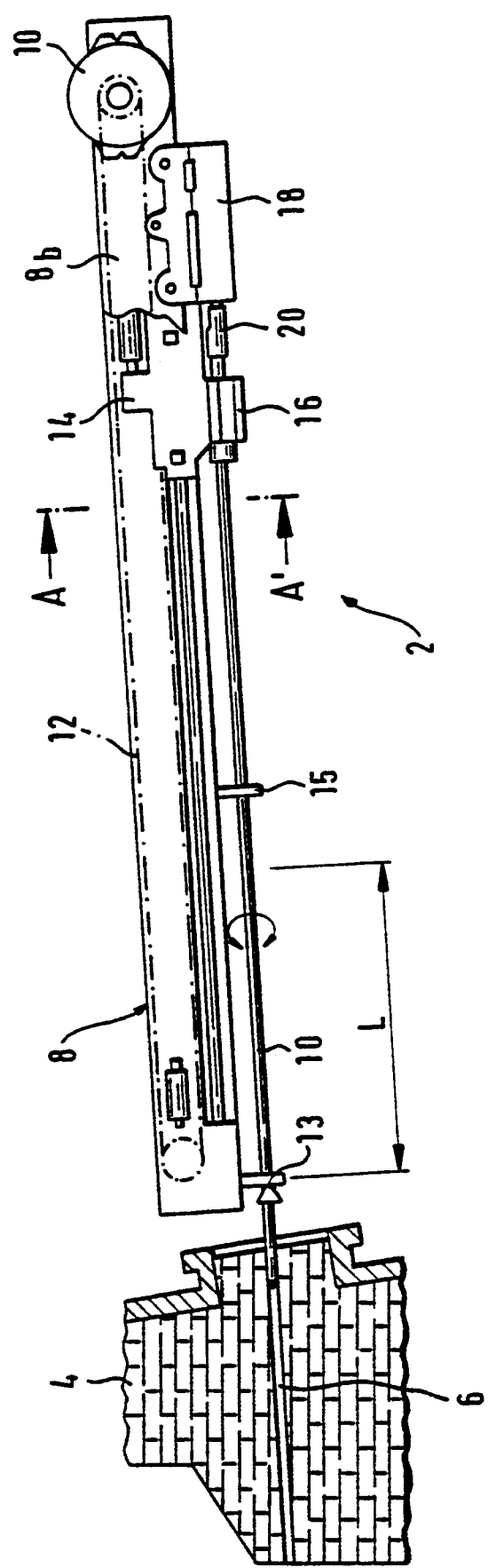
FIG. 1 diagrammatically shows a partial longitudinal section of a piercing machine placed in front of the taphole for introducing a piercing rod into the taphole clay.

FIG. 1 shows a longitudinal section through a piercing machine generally at 2 which may be used for implementing the lost rod method according to the present invention. More particularly, FIG. 1 shows a partial longitudinal section through a mounting which is placed with its front end facing a taphole 6 of a shaft furnace, represented by a section through its wall 4 in line with the taphole 6.

This piercing machine 2 is designed, in order to open the taphole 6, either by conventional drilling, that is to say using a drill (not shown) which is driven by a drilling machine 18 sliding on the mounting 8 and fitted with a coupling 20 for receiving the bit, or by the lost rod method, that is to say by extraction of a rod 10 which has been introduced into the taphole 6 immediately after plugging taphole 6 with a taphole clay.

This operation of introducing a rod 10 into the taphole clay is precisely performed without a hammer using a clamp 16. Clamp 16 is mounted on a carriage 14 sliding on the mounting 8 and driven by powerful drive means, for example one or more hydraulic motors 10 and one or more endless chains 12. It will be noted that rod 10 is supported at the front by a sliding or stationary bearing 13, which may also be designed in order to act as a screen against splashes leaving the taphole when it is opened.

In order to avoid buckling of the rod 10 when a sizeable force is applied to it in order to introduce the rod 10 into the hardening taphole clay, it is possible to apply two different methods aimed at reducing the tendency of the rod 10 to buckle.

The first method consists in applying the rod 10 introduction force in proximity to the free end of the rod 10 and in guiding the latter in intermediate guides placed between the front bearing 13 and the clamp 16. In FIG. 1, one of these guides has been represented by way of example by the reference 15. These intermediate guides then hold the rod 10 in the axis and prevent the formation of deflection that would result in buckling of the rod 10.

The second method consists in applying the introduction force, not at the free end of the rod 10, but at a distance closer to the taphole 6. In this version, the open clamp 16 is brought to a distance L from the front of the mounting 8, it is closed and the rod 10 is introduced into the taphole 6 by advancing the clamp 16, now solidly attached to the rod 10, by the length L as far as the front of the mounting 8 (position B). The clamp 16 is then opened and is retracted by the length L in order again to grip the rod 10 and to insert a second length L into the taphole 6. This reciprocating movement is repeated enough times until the rod 10 has penetrated into the taphole 6 by the desired length.

The present invention proposes to impart to the rod 10 during the introduction operation an oscillatory or rotational movement about its longitudinal axis. It should be noted that this method, which reduces the resistance to the introduction of the rod into the clay, may be applied in conjunction with the first method or the said second method described above.

It will be appreciated that the method provided by this invention provides substantial advantages whether it is used with the first method or if it used with the said second method for introducing the rod. Applied in conjunction with the first method, the present invention thus makes it possible to work with fewer intermediate guides because the axial force exerted on the rod is substantially reduced. On the other hand, when applied in conjunction with the second method, it is possible to increase the travel L of the movement of the carriage 14, and thus reduce the number of reciprocating movements of the clamp 16. This introduces the rod 10 into the taphole clay much more rapidly.

Figure 2:
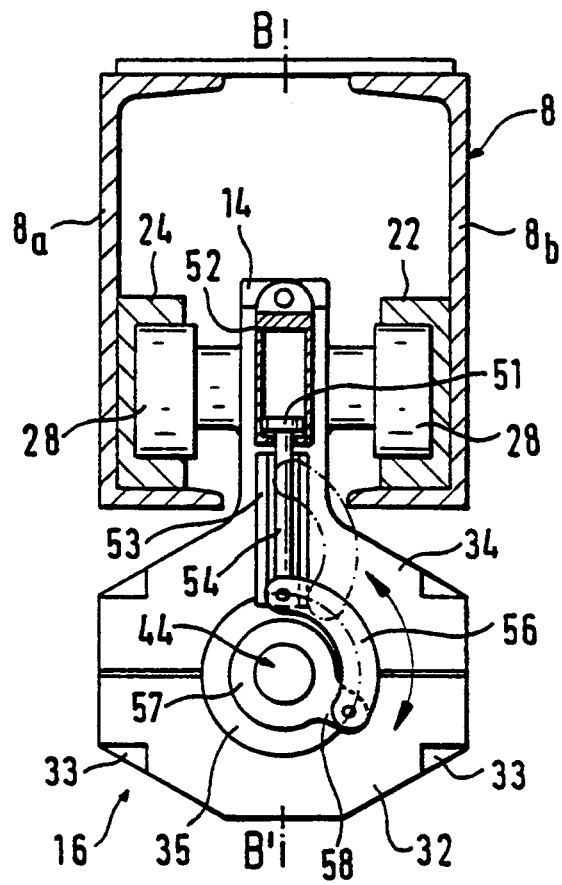
FIG. 2 shows a cross-section along the section line A-A' of FIG. 1, with the special clamp in accordance with the present invention being.
Figure 3:
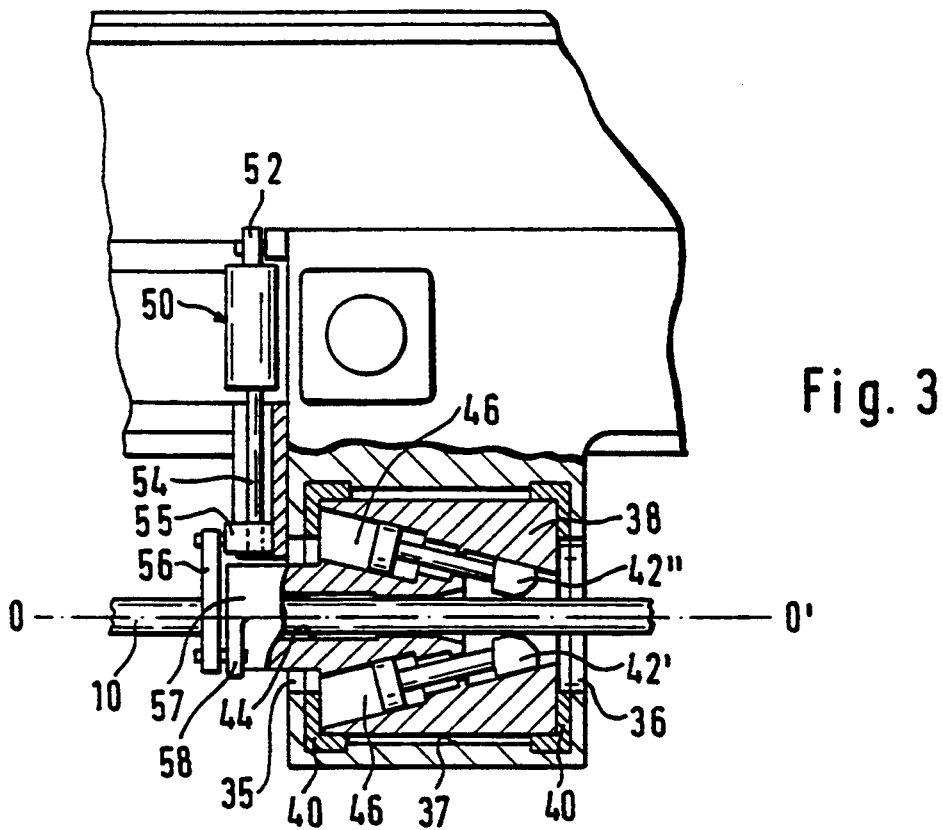
FIG. 3 shows a section along the section line B-B' of FIG. 2.

The method of the present invention is advantageously implemented with a clamp 16 as represented by FIGS. 2 and 3, which is described in detail hereinbelow. This clamp 16 is solidly attached through its framework 34 to the carriage 14, which is mounted for example on runners 28 or rollers, guided by "U-shaped" sections 22, 24 fixed face to face in the mounting 8. In a preferred embodiment, the mounting 8 consists of two beams 8a and 8b assembled together to form a box or like configuration.

In FIG. 2, it is seen that the framework of the clamp is composed of an upper part 34 and a lower part 32, which are assembled together by removable fastening elements, for example bolts represented by their axis 33, in FIG. 2. These two half-frameworks 32, 34 delimit, when they are assembled together, a cylindrical chamber 37 whose longitudinal axis is parallel to the direction of translation of the carriage 14. The cylindrical chamber 37 (see FIG. 3) has, in each base, an opening 35, 36 centered on the longitudinal axis.

Inside the cylindrical chamber 37 is housed a clamp body 38. This body 38 is of cylindrical shape and has a diameter and a length slightly less than the corresponding dimensions of the cylindrical chamber 37. In cylindrical chamber 37, the body 38 rests in two slide bushings 40 which act both as front stops and bearings. The clamp body 38 may therefore rotate freely about its axis, which coincides with the axis of the cylindrical chamber. Furthermore, it is blocked against any axial displacement by the front stops 4 set in the cylindrical chamber 37 and bearing against the two front parts of the framework, longitudinally delimiting the chamber 37.

The clamp body 38 is passed through longitudinally by an axial bore 44 whose diameter is slightly greater than that of the rod 10. It comprises at least one pair of jaws 42', 42", which are arranged symmetrically around the axial bore 44 and may be moved obliquely in the direction of the latter. These jaws are moved pneumatically and are preferably fitted with a return spring (not shown) for opening. It is important to note that this clamp body must be directed in the chamber 37 so that the axes of movement of the jaws 42' and 42" converge in the direction of the back of the mounting. Thus, the jaws 42' and 42'"bite in the closed position into the rod when the clamp is moved forward.

The clamp body 38 is extended axially by a sleeve 57 through the opening 35. This sleeve 57 comprises at its end a crank 58 solidly attached to it. An arm 56 is hinged by one of its ends to the crank 58 and by the other end to a piston rod 54. This piston rod 54 is guided in a slideway 53 which is situated in the extension of a jack cylinder 52, solidly attached to the carriage 14. The longitudinal axis of the arm 58 is preferably a circular arc so that the arm 58 can be placed around the rod 10 when the piston rod 54 has completely left the cylinder 52.

It will be noted that a reciprocating movement of the piston rod 54 imparts to the crank 58, and therefore to the clamp body 38, an oscillatory rotational movement with an angular amplitude of approximately 90°. When the jaws 42' and 42" of the clamp body 38 are closed on the rod, they communicate this oscillatory movement to the rod 10, at the same time as they transmit to the latter the axial introduction force.

The reciprocating movement of the piston rod 54 is obtained by periodically altering the pressures on either side of the piston 51 integral with the piston rod 54 and sliding in the cylinder 52 of the jack 50. The frequency of this movement is preferably determined in accordance with the taphole clay used.

Given that the angular amplitude of the oscillatory movement of the clamp body 38 is relatively small, the jaws 42' and 42" could be supplied with compressed air in a known manner with hoses. It is, however, also possible to provide hinged pipes or rotating connectors.

It will be noted that the clamp body 38 may also comprise a second pair of jaws whose two axes of movement converge in the direction of the front of the mounting. This clamp might then be used for extracting the rod 10 from the hardened taphole clay. The axes of the second pair of jaws are for example contained in a plane passing through the axis of the clamp and which is perpendicular to the section plane in FIG. 3.

If, conversely, the clamp body 38 comprises only one pair of jaws designed for introducing the rod, the coupling 20 of the drilling machine 18 may be replaced with a unidirectional clamp designed for extracting the rod 10. This clamp 20 must, however, directly bear on the clamp 16 during the movement for retracting the latter, in order to avoid the drilling machine 18 transmitting a pulling force to the rod.

It is understood that means other than the jaws described hereinabove may be provided for blocking the rod in rotation and/or for communicating an axial force to it. A cotter (or key) might for example interact with flats machined in the piercing rod 10 in order to immobilize the latter in rotation and in translation within the body of the clamp 38.

It should be noted that the present invention significantly reduces the forces that are required to introduce the piercing rod into the taphole clay of the lost rod method. This eliminates the need of the use of the bidirectional hammer which is required when extremely large forces are required to introduce the piercing rod. The removal of the use of the bidirectional hammer results in a substantial reduction in the noise level around the shaft furnace. Furthermore, the clamp described by this invention is both rugged and long lasting.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for forming and opening a taphole of a shaft furnace, comprising the steps of:
   filling an existing taphole with a taphole clay;
   introducing a piercing rod having a longitudinal axis in said existing taphole before said taphole clay is fully hardened, including;
   applying an axial pushing force to said piercing rod in the direction of said taphole;
   simultaneously rotating or oscillating the piercing rod about its longitudinal axis; and
   extracting said piercing rod when the taphole clay is hardened in order to form and open the taphole.

2. The method of claim 1 wherein:
   an oscillatory angular movement with an angular amplitude of less than 180° is simultaneously applied to the piercing rod with said axial pushing force.

3. The method of claim 1 including the step of:
   guiding the piercing rod with intermediate guides in order to prevent its buckling when pushing it into the taphole clay.

4. The method of claim 1 wherein:
   the piercing rod subjected to said axial pushing force has a length and defines an equivalent buckling length that is shorter than its length; and
   by repeatedly applying said axial pushing force to the piercing rod at a distance D from the taphole, which is less than the equivalent buckling length of the piercing rod, the piercing rod is driven each time by a length L into the taphole clay until it has penetrated the latter to the desired depth where $L < D$.

5. A clamp for introducing a piercing rod, having a longitudinal axis, into a taphole previously filled with taphole clay, said clamp being operably connected to a taphole piercing machine, said clamp comprising:
   a housing adapted for operable connection to a taphole piercing machine drive means, said drive means being capable of imparting to said housing an axial pushing force;
   a clamp body rotatingly supported and guided inside said housing;
   pushing force transmitting means for transmitting said axial pushing force to said piercing rod, said pushing force transmitting means being integral with said clamp body; and oscillating means for imparting to said clamp body an oscillatory angular movement about an axis coincident with said longitudinal axis of the piercing rod when said rod is mounted on said taphole piercing machine.

6. The clamp of claim 5, wherein:

said oscillating means includes a hydraulic jack; and said connecting means includes a rod/crank mechanism converting a linear reciprocating movement of the hydraulic jack into an oscillatory angular movement of the clamp body.

7. The clamp of claim 6, wherein:

said rod/crank mechanism includes a circular arm having a first and a second end, said first end being hinged to a crank of the clamp body and said second end being hinged to a piston rod of said hydraulic jack, said circular arm being shaped so that it can be placed around the piercing rod.

8. The clamp of claim 5, wherein:

said housing means includes slide bushings which act as front stops and as cylindrical bearings for said clamp body.

9. The clamp of claim 5, wherein:

said pushing force transmitting means includes gripping means for releasably gripping the piercing rod.

10. The clamp of claim 5, wherein:

said clamp body has a channel for passing the piercing rod through the clamp; and said pushing force transmitting means includes gripping means arranged around said channel for releasably gripping the piercing rod.

11. The clamp of claim 10, wherein:

said gripping means includes one pair of jaws symmetrically arranged around said channel;

said jaws are obliquely movable relative to said clamp body, so as to converge in said channel and bite into the piercing rod when the clamp transmits said pushing force to the rod.

* * * * *